United States Patent
Li et al.

(10) Patent No.: US 10,495,947 B2
(45) Date of Patent: Dec. 3, 2019

(54) SMART FLASHLIGHT CONTROL METHOD AND MOBILE TERMINAL

(71) Applicant: JRD Communication Inc., Shenzhen (CN)

(72) Inventors: Chao Li, Shenzhen (CN); Shuguang Liu, Shenzhen (CN); Huizi Ouyang, Shenzhen (CN); Huiyi Zeng, Shenzhen (CN); Deming Zhao, Shenzhen (CN)

(73) Assignee: JRD Communication Inc., Shenzhen (CN)

( * ) Notice: Subject to any disclaimer, the term of this patent is extended or adjusted under 35 U.S.C. 154(b) by 0 days.

(21) Appl. No.: 16/314,683

(22) PCT Filed: Jul. 17, 2017

(86) PCT No.: PCT/CN2017/093232
§ 371 (c)(1),
(2) Date: Jan. 2, 2019

(87) PCT Pub. No.: WO2018/014816
PCT Pub. Date: Jan. 25, 2018

(65) Prior Publication Data
US 2019/0258140 A1    Aug. 22, 2019

(30) Foreign Application Priority Data
Jul. 22, 2016   (CN) .......................... 2016 1 0582287

(51) Int. Cl.
*G03B 15/05* (2006.01)
*G03B 17/16* (2006.01)
(Continued)

(52) U.S. Cl.
CPC .............. *G03B 15/05* (2013.01); *G03B 7/16* (2013.01); *H05B 37/0218* (2013.01); *H05B 37/0272* (2013.01)

(58) Field of Classification Search
None
See application file for complete search history.

(56) References Cited

U.S. PATENT DOCUMENTS

| | | | | |
|---|---|---|---|---|
| 5,384,616 A | * | 1/1995 | Wilson .................. | G03B 15/05 396/155 |
| 8,200,075 B1 | * | 6/2012 | Lai ........................ | G03B 15/05 396/165 |

(Continued)

FOREIGN PATENT DOCUMENTS

| | | |
|---|---|---|
| CN | 1570865 | 1/2005 |
| CN | 102056156 | 5/2011 |

(Continued)

OTHER PUBLICATIONS

International Search Report and the Written Opinion dated Sep. 18, 2017 From the International Searching Authority Re. Application No. PCT/CN2017/093232 and Its Translation of Search Report Into English. (9 Pages).

*Primary Examiner* — William B Perkey

(57) ABSTRACT

A smart flashlight control method and a mobile terminal are provided. The method includes: when detecting that a photographing mode of a mobile terminal is turned on, detecting ambient light intensity of the mobile terminal; when the ambient light intensity of the mobile terminal is smaller than a first threshold, turning on a flashlight; detecting whether a target to be photographed by the mobile terminal includes a predetermined type; and when the target to be photographed includes the predetermined type, adjusting light intensity of a fill light in the mobile terminal, to achieve the best photographing effect.

18 Claims, 2 Drawing Sheets

(51) Int. Cl.
*H05B 37/02* (2006.01)
*G03B 7/16* (2014.01)

(56) References Cited

U.S. PATENT DOCUMENTS

| | | | | |
|---|---|---|---|---|
| 2006/0193622 | A1* | 8/2006 | Endo | G03B 7/16 |
| | | | | 396/157 |
| 2009/0073275 | A1* | 3/2009 | Awazu | G03B 15/02 |
| | | | | 348/222.1 |
| 2010/0058317 | A1 | 3/2010 | Braams | |
| 2018/0027164 | A1* | 1/2018 | Zhou | G03B 15/05 |
| | | | | 396/105 |
| 2019/0258140 | A1* | 8/2019 | Li | G03B 7/16 |

FOREIGN PATENT DOCUMENTS

| | | |
|---|---|---|
| CN | 102171652 | 8/2011 |
| CN | 104102499 | 10/2014 |
| CN | 104580886 | 4/2015 |
| CN | 104849945 | 8/2015 |
| CN | 105049737 | 11/2015 |
| CN | 105791681 | 7/2016 |
| CN | 105975850 | 9/2016 |
| CN | 106210334 | 12/2016 |
| WO | WO 2018/001365 | 1/2018 |
| WO | WO 2018/014816 | 1/2018 |

* cited by examiner

SMART FLASHLIGHT CONTROL METHOD AND MOBILE TERMINAL

RELATED APPLICATIONS

This application is a National Phase of PCT Patent Application No. PCT/CN2017/093232 having International filing date of Jul. 17, 2017, which claims the benefit of priority of Chinese Patent Application No. 201610582287.2 filed on Jul. 22, 2016. The contents of the above applications are all incorporated by reference as if fully set forth herein in their entirety.

FIELD AND BACKGROUND OF THE INVENTION

The present disclosure relates to a technical field of photography, and more particularly to a smart flashlight control method and a mobile terminal.

With continuous development of mobile internet technologies, mobile terminals are more and more popular, and have become necessities in life and work of people. Functions of mobile terminals are more and more powerful, and gradually replace uses of computers and cameras. Regarding photographing functions, whether or not it is convenient to photograph, and whether or not photos photographed are clear are some important factors considered when users select products to be purchased. Although there is a flashlight serving as a fill light when photographing under a low light condition, the flashlight is always turned on at the moment of photographing, which not only makes eyes of a person being photographed in which the flashlight is shined unable to open, but also causes output skin color and output effects to be undesirable.

Currently, a common treatment method is to retouch a photograph or to require another person to hold a mobile phone or other lighting equipment to assist photographing with a fill light. However, the method is very complicated to implement, and the retouched photograph also loses its own taste.

SUMMARY OF THE INVENTION

The embodiments of the present disclosure provide a smart flashlight control method and a mobile terminal, which solve a problem that the existing flashlight control manner cannot meet demands of a user.

The technical solutions of the present disclosure are as follows.

A non-transitory computer-readable medium with one or more application programs stored thereon is provided. When executed by a camera application processor, the one or more application programs cause the camera application processor to perform a method comprising:

when detecting that a photographing mode of a mobile terminal is turned on, detecting first ambient light intensity of the mobile terminal;

when the first ambient light intensity of the mobile terminal is smaller than a first threshold, turning on a flashlight before photographing, wherein the flashlight has light intensity such that a target to be photographed is allowed to adapt to increased ambient light intensity;

detecting whether the target to be photographed by the mobile terminal comprises a predetermined type of target;

when the target to be photographed comprises the predetermined type of target, adjusting light intensity of a fill light in the mobile terminal; and photographing, by an image sensor, the target to be photographed with the flashlight and the fill light, wherein the flashlight is turned on and the fill light is light intensity adjusted.

Preferably, the step of, when the target to be photographed comprises the predetermined type of target, adjusting the light intensity of the fill light in the mobile terminal includes: when the target to be photographed is a human, adjusting the fill light to be lower than a second threshold, wherein the second threshold is smaller than a maximum adjustable value of the light intensity of the fill light.

Preferably, the second threshold is half of the maximum adjustable value of the light intensity of the fill light.

Preferably, after the step of detecting whether the target to be photographed by the mobile terminal comprises the predetermined type of target, the method further includes: when the target to be photographed is not a human, controlling the light intensity of the fill light to be adjusted within an intensity range of the fill light.

Preferably, after the step of detecting the first ambient light intensity of the mobile terminal, the method further includes: in a case that the flashlight is not turned on, when detecting that the first ambient light intensity of the mobile terminal is larger than a third threshold, not turning on the fill light, and the step of detecting whether the target to be photographed by the mobile terminal comprises the predetermined type of target and the step of, when the target to be photographed comprises the predetermined type of target, adjusting the light intensity of the fill light in the mobile terminal are not performed.

Preferably, the third threshold is larger than the first threshold, and the third threshold is equal to second ambient light intensity under which the mobile terminal achieves a predetermined photographing effect without turning on the flashlight.

A mobile terminal, including:
a flashlight and a fill light;
an image sensor;
a camera application processor;
a memory; and
one or more application programs stored in the memory, and configured to be executed by the camera application processor, to cause the camera application processor to implement:
a flashlight control module configured to, when detecting that a user turns on a photographing mode of a mobile terminal, determine whether the flashlight is to be turned on before photographing based on first ambient light intensity of the mobile terminal, and control the flashlight based on a determined result, wherein when the flashlight is determined to be turned on before photographing, the flashlight has light intensity such that a target to be photographed is allowed to adapt to increased ambient light intensity;
a fill light control module configured to detect a type of the target to be photographed, and adjust light intensity of a fill light based on whether the target to be photographed is a predetermined type of target; and
a photographing control module configured to photograph, by the image sensor, the target to be photographed with the flashlight and the fill light, wherein the flashlight is turned on and the fill light is light intensity adjusted.

Preferably, in the flashlight control module, when the first ambient light intensity of the mobile terminal is smaller than a first threshold, the flashlight is turned on, and when the first ambient light intensity of the mobile terminal is larger than the first threshold, the flashlight is not turned on Preferably, in the fill light control module, when the target to be photographed is the predetermined type of target, the light intensity of the fill light is adjusted to be lower than a second threshold, and when the target to be photographed is not the predetermined type of target, the light intensity of the fill light is controlled to be adjusted within an intensity range of the fill light.

Preferably, the second threshold is half of a maximum adjustable value of the light intensity of the fill light.

Preferably, in the fill light control module, in a case that the flashlight is not turned on, when the first ambient light intensity of the mobile terminal is larger than a third threshold, the fill light is not turned on, the type of the target to be photographed is not detected, and the light intensity of the fill light is not adjusted based on whether the target to be photographed is the predetermined type of target.

Preferably, the third threshold is larger than the first threshold, and the third threshold is equal to second ambient light intensity under which the mobile terminal achieves a predetermined photographing effect without turning on the flashlight.

A mobile terminal, including:
a flashlight and a fill light;
an image sensor;
a camera application processor;
a memory; and
one or more application programs stored in the memory, and configured to be executed by the camera application processor, wherein the one or more application programs include operational instructions, so that the following steps are executed:
when detecting that a photographing mode of a mobile terminal is turned on, detecting first ambient light intensity of the mobile terminal;
when the first ambient light intensity of the mobile terminal is smaller than a first threshold, turning on a flashlight before photographing, wherein the flashlight has light intensity such that a target to be photographed is allowed to adapt to increased ambient light intensity;
detecting whether the target to be photographed by the mobile terminal comprises a predetermined type of target;
when the target to be photographed comprises the predetermined type of target, adjusting light intensity of a fill light in the mobile terminal; and
photographing, by the image sensor, the target to be photographed with the flashlight and the fill light, wherein the flashlight is turned on and the fill light is light intensity adjusted.

Preferably, the step of, when the target to be photographed comprises the predetermined type of target, adjusting the light intensity of the fill light in the mobile terminal includes: when the target to be photographed is a human, adjusting the fill light to be lower than a second threshold, wherein the second threshold is smaller than a maximum adjustable value of the light intensity of the fill light.

Preferably, the second threshold is half of the maximum adjustable value of the light intensity of the fill light.

Preferably, after the step of detecting whether the target to be photographed by the mobile terminal comprises the predetermined type of target, the steps further includes: when the target to be photographed is not a human, controlling the light intensity of the fill light to be adjusted within an intensity range of the fill light.

Preferably, after the step of detecting the first ambient light intensity of the mobile terminal, the steps further includes: in a case that the flashlight is not turned on, when detecting that the first ambient light intensity of the mobile terminal is larger than a third threshold, not turning on the fill light, and the step of detecting whether the target to be photographed by the mobile terminal comprises the predetermined type of target and the step of, when the target to be photographed comprises the predetermined type of target, adjusting the light intensity of the fill light in the mobile terminal are not performed.

Preferably, the third threshold is larger than the first threshold, and the third threshold is equal to second ambient light intensity under which the mobile terminal achieves a predetermined photographing effect without turning on the flashlight.

In the present disclosure, before photographing, based on the ambient light intensity of the mobile terminal, whether the flashlight is on or off is automatically controlled, and during photographing, based on the type of the target to be photographed, the fill light function is automatically adjusted. Therefore, the best photographing effect is achieved, and meanwhile, eyes of the target to be photographed are not affected.

DESCRIPTION OF SPECIFIC EMBODIMENTS OF THE INVENTION

The present disclosure provides a smart flashlight control method and system, and a mobile terminal. In order to make objects, technical solutions and effects of the present disclosure clearer and more definite, the present disclosure will be further described in detail hereinafter. It is to be understood that specific embodiments described herein are only used to illustrate the present disclosure, and not used to limit the present disclosure.

Figure 1:
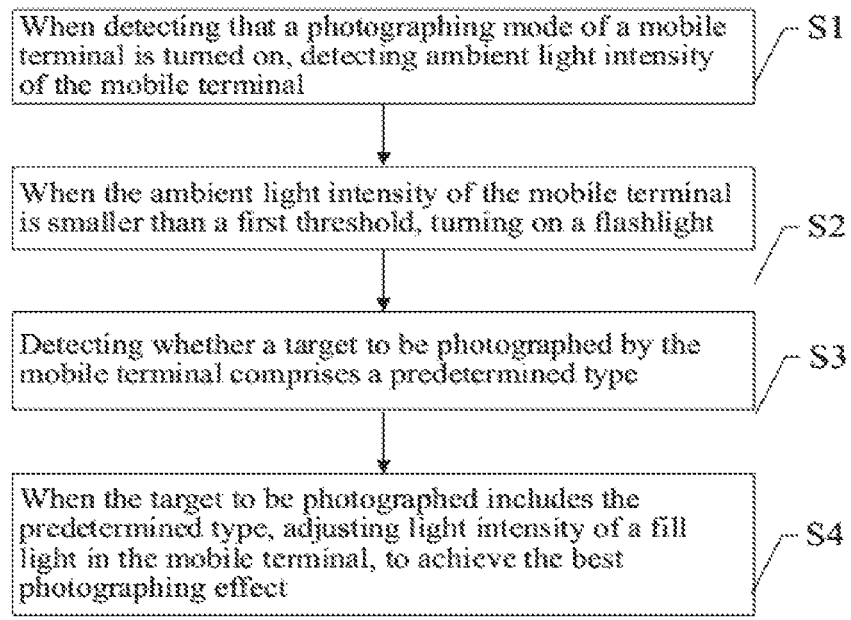
FIG. 1 is a flowchart of a smart flashlight control method in accordance with a preferred embodiment of the present disclosure.

Referring to FIG. 1, FIG. 1 is a flowchart of a smart flashlight control method in accordance with a preferred embodiment of the present disclosure. As illustrated in the figure, the method includes the following steps:

a step S1 of when detecting that a photographing mode of a mobile terminal is turned on, detecting ambient light intensity of the mobile terminal;

a step S2 of when the ambient light intensity of the mobile terminal is smaller than a first threshold, turning on a flashlight;

a step S3 of detecting whether a target to be photographed by the mobile terminal includes a predetermined type; and a step S4 of when the target to be photographed includes the predetermined type, adjusting light intensity of a fill light in the mobile terminal, to achieve the best photographing effect.

The present disclosure mainly detects the ambient light intensity of the mobile terminal, determines whether to turn on the flashlight when a user turns on a camera (turns on a photographing function), if the ambient light intensity of the terminal is determined lower than the predetermined threshold, determines the flashlight is to be turned on, turns on the flashlight, to allow the target to be photographed to adapt to increased ambient light intensity, and meanwhile, based on the type of the target to be photographed, adjusts the intensity of the fill light, such as increases the intensity of the fill light. In this manner, ambient light goes through a transitioning process, the target to be photographed adapts to the ambient light more easily, and a photographing effect is better.

Specifically, in the steps S1 and S2, when the ambient light intensity of the mobile terminal is smaller than the first threshold, the flashlight is turned on, and when the ambient light intensity of the mobile terminal is larger than the first threshold, the flashlight is not turned on.

It can be understood that when the ambient light intensity of the mobile terminal is smaller than the first threshold, the ambient light intensity indicates that the ambient light of the mobile terminal is weaker, and the flashlight needs to be first turned on. When the ambient light intensity is larger than the first threshold, the ambient light intensity indicates that the ambient light is stronger, and the flashlight does not need to be turned on. The flashlight can be turned on if needed subsequently.

In the steps S3 and S4, different processes are performed according to types of targets to be photographed. If the target to be photographed is a human, then turning on or not turning on the fill light and the intensity of the fill light both affect eyes of the target to be photographed. If the target to be photographed is not a human, then the target to be photographed is not affected. Therefore, the two situations need to be treated differently, to achieve the best photographing effect.

Further, when the target to be photographed is a human, the intensity of the fill light is adjusted to be lower than a second threshold. That is, when the target to be photographed is a human, the intensity of the fill light has an upper limit. The upper limit is the second threshold. The intensity of the fill light cannot exceed the second threshold, a purpose of which is to prevent the fill light from being shined into eyes of the target to be photographed, and then causing the target to be photographed to close the eyes. Therefore, the eyes of the target to be photographed are effectively protected.

When the target to be photographed is not a human, for example the target to be photographed is a certain scene, the intensity of the fill light is controlled to be adjusted within an intensity range of the fill light itself. That is, if the target to be photographed is not a human, adjustable intensity range of the fill light is not affected, and the intensity of the fill light can be adjusted within the intensity range of the fill light itself. The intensity of the fill light is determined based on a current light intensity. For example, if the current light intensity is insufficient, the intensity of the fill light is appropriately increased, and if the current light intensity has become saturated, the intensity of the fill light is appropriately adjusted, so that the best photographing effect is just achieved. The second threshold should be a certain value within the intensity range of the fill light itself. For example, if a maximum adjustable value of the intensity of the fill light itself is A, then the second threshold may be equal to A/2.

In addition, In the step S1, in a case that the flashlight is not turned on, when the ambient light intensity of the mobile terminal is larger than a third threshold, the fill light is not turned on. The third threshold is larger than the first threshold. That is, the ambient light intensity of the mobile terminal is sufficiently high, so the flashlight is not turned on. At this time, because the ambient light intensity is larger than the threshold sufficiently high, the fill light does not need to be turned on, and photographing may be directly performed. That is, the third threshold is equal to ambient light intensity under which the mobile terminal achieves a predetermined photographing effect without turning on the flashlight.

Amounts of the first threshold and the third threshold may be determined experimentally. For example, if analysis indicates that under a certain standard, the ambient light intensity of the mobile terminal results in a photograph with a better effect without the flashlight turned on, then the first threshold is set to the ambient light intensity.

The mobile terminal in the present disclosure has a light sensor (L-sensor) installed therein, and may detect a current ambient light intensity of the mobile terminal, and determine whether a current ambient is bright or dark through brightness perception.

In addition, the mobile terminal of the present disclosure also has a face detection function. That is, during photographing, the mobile terminal detects whether a human exists in a preview image, thereby better controlling flashlights subsequently. There are many descriptions and embodiments in the related art that are related to face detection technologies, and are omitted here.

The present disclosure fully considers a use scene of a user and personal health, and combines the face detection function and the photographing function. When applying the fill light, the fill light is finely adjusted based on whether the target to be photographed is a human or an object. If the target to be photographed is a human, the intensity of the fill light is relatively small, to avoid human eyes to be stimulated by strong light, and if the target to be photographed is an object, the intensity of the fill light is selected such that the best photographing effect is achieved.

Figure 2:
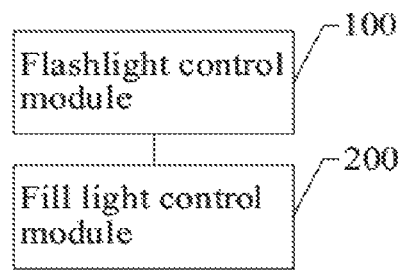
FIG. 2 is a structural block diagram of a smart flashlight control system in accordance with a preferred embodiment of the present disclosure.

Based on the foregoing methods, the present disclosure also provides a smart flashlight control system. FIG. 2 is a structural block diagram of the smart flashlight control system in accordance with a preferred embodiment of the present disclosure. As illustrated in FIG. 2, the smart flashlight control system includes:

a flashlight control module 100 configured to, when detecting that a user turns on a photographing function of a mobile terminal, determine whether the flashlight is to be turned on based on ambient light intensity of the mobile terminal, and control the flashlight based on a determined result; and a fill light control module 200 configured to detect a type of a target to be photographed, and adjust intensity of a fill light based on whether the target to be photographed is a human, to achieve the best photographing effect.

Further, in the flashlight control module 100, when the ambient light intensity of the mobile terminal is smaller than a first threshold, the flashlight is turned on, and when the ambient light intensity of the mobile terminal is larger than the first threshold, the flashlight is not turned on.

Further, in the fill light control module 200, when the target to be photographed is a predetermined type such as when the target to be photographed is a human, the intensity of the fill light is adjusted to be lower than a second threshold, and when the target to be photographed is not a human, the intensity of the fill light is controlled to be adjusted within a range higher than the second threshold.

Further, in the fill light control module 200, in a case that the flashlight is not turned on, when the ambient light intensity of the mobile terminal is larger than a third threshold, the fill light is not turned on.

Figure 3:
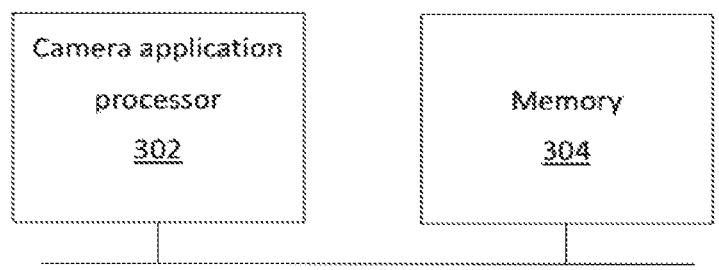
FIG. 3 is a structural block diagram illustrating a hardware system that implements any of the smart flashlight control systems described with reference to FIG. 2.

FIG. 3 is a structural block diagram illustrating a hardware system for implementing the smart flashlight control system in FIG. 2. The hardware system includes a camera application processor 302, and a memory 304. One or more application programs are stored in the memory 304, and configured to be executed by the camera application processor 302, to cause the camera application processor 302 to implement the smart flashlight control system in FIG. 2.

The present disclosure also provides a mobile terminal. The mobile terminal includes the aforementioned hardware system that implements any of the smart flashlight control systems described with reference to FIG. 2.

Details of the aforementioned modules have been provided above, and are omitted here.

People of ordinary skill in the art can understand that all or part of flows of the foregoing methods may be realized by one or more computer programs instructing related hardware. The one or more computer programs may be stored in a computer readable storage medium. When the one or more computer programs are executed, the flow of any of the foregoing method embodiments is performed. The storage medium may be a magnetic disk, an optical disk, a read only memory (ROM), or a random access memory (RAM).

In summary, before photographing, based on the ambient light intensity of the mobile terminal, whether the flashlight is on or off is automatically controlled, and during photographing, based on the type of the target to be photographed, the fill light function is automatically adjusted. Therefore, the best photographing effect is achieved, and meanwhile, eyes of the target to be photographed are not affected.

It is to be understood that applications of the present disclosure should not be limited to the aforementioned examples. For people of ordinary skill in the art, modifications or variations may be made based on the aforementioned description. All of the modifications and variations should fall within the protection scope of the appended claims of the present disclosure.

What is claimed is:

1. A non-transitory computer-readable medium with one or more application programs stored thereon, that when executed by a camera application processor, cause the camera application processor to perform a method comprising:
   when detecting that a photographing mode of a mobile terminal is turned on, detecting first ambient light intensity of the mobile terminal;
   when the first ambient light intensity of the mobile terminal is smaller than a first threshold, turning on a flashlight before photographing, wherein the flashlight has light intensity such that a target to be photographed is allowed to adapt to increased ambient light intensity;
   detecting whether the target to be photographed by the mobile terminal comprises a predetermined type of target;
   when the target to be photographed comprises the predetermined type of target, adjusting light intensity of a fill light in the mobile terminal; and
   photographing, by an image sensor, the target to be photographed with the flashlight and the fill light, wherein the flashlight is turned on and the fill light is light intensity adjusted.

2. The non-transitory computer-readable medium of claim 1, wherein the step of, when the target to be photographed comprises the predetermined type of target, adjusting the light intensity of the fill light in the mobile terminal comprises:
   when the target to be photographed is a human, adjusting the fill light to be lower than a second threshold, wherein the second threshold is smaller than a maximum adjustable value of the light intensity of the fill light.

3. The non-transitory computer-readable medium of claim 2, wherein the second threshold is half of the maximum adjustable value of the light intensity of the fill light.

4. The non-transitory computer-readable medium of claim 1, wherein after the step of detecting whether the target to be photographed by the mobile terminal comprises the predetermined type of target, the method further comprises:
   when the target to be photographed is not a human, controlling the light intensity of the fill light to be adjusted within an intensity range of the fill light.

5. The non-transitory computer-readable medium of claim 1, wherein after the step of detecting the first ambient light intensity of the mobile terminal, the method further comprises:
   in a case that the flashlight is not turned on, when detecting that the first ambient light intensity of the mobile terminal is larger than a third threshold, not turning on the fill light, and the step of detecting whether the target to be photographed by the mobile terminal comprises the predetermined type of target and the step of, when the target to be photographed comprises the predetermined type of target, adjusting the light intensity of the fill light in the mobile terminal are not performed.

6. The non-transitory computer-readable medium of claim 5, wherein the third threshold is larger than the first threshold, and the third threshold is equal to second ambient light intensity under which the mobile terminal achieves a predetermined photographing effect without turning on the flashlight.

7. A mobile terminal, comprising:
   a flashlight and a fill light;
   an image sensor;
   a camera application processor;
   a memory; and
   one or more application programs stored in the memory, and configured to be executed by the camera application processor, to cause the camera application processor to implement:
     a flashlight control module configured to, when detecting that a user turns on a photographing mode of a mobile terminal, determine whether the flashlight is to be turned on before photographing based on first ambient light intensity of the mobile terminal, and control the flashlight based on a determined result, wherein when the flashlight is determined to be turned on before photographing, the flashlight has light intensity such that a target to be photographed is allowed to adapt to increased ambient light intensity;
     a fill light control module configured to detect a type of the target to be photographed, and adjust light intensity of a fill light based on whether the target to be photographed is a predetermined type of target; and
     a photographing control module configured to photograph, by the image sensor, the target to be photographed with the flashlight and the fill light, wherein the flashlight is turned on and the fill light is light intensity adjusted.

8. The mobile terminal of claim 7, wherein in the flashlight control module, when the first ambient light intensity of the mobile terminal is smaller than a first threshold, the flashlight is turned on, and when the first ambient light intensity of the mobile terminal is larger than the first threshold, the flashlight is not turned on.

9. The mobile terminal of claim 7, wherein in the fill light control module, when the target to be photographed is the predetermined type of target, the light intensity of the fill light is adjusted to be lower than a second threshold, and when the target to be photographed is not the predetermined type of target, the light intensity of the fill light is controlled to be adjusted within an intensity range of the fill light.

10. The mobile terminal of claim 9, wherein the second threshold is half of a maximum adjustable value of the light intensity of the fill light.

11. The mobile terminal of claim 7, wherein in the fill light control module, in a case that the flashlight is not turned on, when the first ambient light intensity of the mobile terminal is larger than a third threshold, the fill light is not turned on the type of the target to be photographed is not detected, and the light intensity of the fill light is not adjusted based on whether the target to be photographed is the predetermined type of target.

12. The mobile terminal of claim 11, wherein the third threshold is larger than the first threshold, and the third threshold is equal to second ambient light intensity under which the mobile terminal achieves a predetermined photographing effect without turning on the flashlight.

13. A mobile terminal, comprising:
a flashlight and a fill light;
an image sensor;
a camera application processor;
a memory; and
one or more application programs stored in the memory, and configured to be executed by the camera application processor, wherein the one or more application programs include operational instructions, so that the following steps are executed:
when detecting that a photographing mode of a mobile terminal is turned on, detecting first ambient light intensity of the mobile terminal;
when the first ambient light intensity of the mobile terminal is smaller than a first threshold, turning on a flashlight before photographing, wherein the flashlight has light intensity such that a target to be photographed is allowed to adapt to increased ambient light intensity;
detecting whether the target to be photographed by the mobile terminal comprises a predetermined type of target;
when the target to be photographed comprises the predetermined type of target, adjusting light intensity of a fill light in the mobile terminal; and
photographing, by the image sensor, the target to be photographed with the flashlight and the fill light, wherein the flashlight is turned on and the fill light is light intensity adjusted.

14. The mobile terminal of claim 13, wherein the step of, when the target to be photographed comprises the predetermined type of target, adjusting the light intensity of the fill light in the mobile terminal comprises:
when the target to be photographed is a human, adjusting the fill light to be lower than a second threshold, wherein the second threshold is smaller than a maximum adjustable value of the light intensity of the fill light.

15. The mobile terminal of claim 14, wherein the second threshold is half of the maximum adjustable value of the light intensity of the fill light.

16. The mobile terminal of claim 13, wherein after the step of detecting whether the target to be photographed by the mobile terminal comprises the predetermined type of target, the steps further comprise:
when the target to be photographed is not a human, controlling the light intensity of the fill light to be adjusted within an intensity range of the fill light.

17. The mobile terminal of claim 13, wherein after the step of detecting the first ambient light intensity of the mobile terminal, the steps further comprise:
in a case that the flashlight is not turned on, when detecting that the first ambient light intensity of the mobile terminal is larger than a third threshold, not turning on the fill light, and the step of detecting whether the target to be photographed by the mobile terminal comprises the predetermined type of target and the step of, when the target to be photographed comprises the predetermined type of target, adjusting the light intensity of the fill light in the mobile terminal are not performed.

18. The mobile terminal of claim 17, wherein the third threshold is larger than the first threshold, and the third threshold is equal to second ambient light intensity under which the mobile terminal achieves a predetermined photographing effect without turning on the flashlight.

* * * * *